United States Patent [19]

Zwirner

[11] Patent Number: 4,719,136
[45] Date of Patent: Jan. 12, 1988

[54] HIGH FREQUENCY WELDABLE TEXTILE MATERIAL

[75] Inventor: Gerhard Zwirner, Haan, Fed. Rep. of Germany

[73] Assignee: Gebr. Happich GmbH, Fed. Rep. of Germany

[21] Appl. No.: 842,068

[22] Filed: Mar. 20, 1986

Related U.S. Application Data

[63] Continuation of Ser. No. 632412, Jul. 19, 1984, abandoned.

[30] Foreign Application Priority Data

Jul. 28, 1983 [DE] Fed. Rep. of Germany ....... 3327232

[51] Int. Cl.$^4$ ................................................ B32B 3/00
[52] U.S. Cl. ..................................... 428/58; 156/273; 156/304.1; 156/304.6; 428/219
[58] Field of Search ................. 428/58, 219; 156/273, 156/304.1, 304.6

[56] References Cited

FOREIGN PATENT DOCUMENTS 0026330  4/1981  European Pat. Off. .

Primary Examiner—Marion C. McCamish
Attorney, Agent, or Firm—Ostrolenk, Faber, Gerb & Soffen

[57] ABSTRACT

A plastic textile material comprising a fiber web such as woven and knitted fabrics, felt or velvet. The web may be covered with plastic on one side by a backing or the web fibers may be plastic coated. The plasticized web has a minimum weight per square meter of at least 300 grams and a maximum weight of 1,500 grams. Both the web of fibers and its plastic coating can be butt-welded in a high frequency field. The textile material can serve as a covering material for a padding, such as a sun visor.

50 Claims, No Drawings

HIGH FREQUENCY WELDABLE TEXTILE MATERIAL

RELATED APPLICATIONS

This is a continuation of U.S. patent application Ser. No. 632,412, filed July 19, 1984 now abandoned.

FIELD OF THE INVENTION

The invention relates to textile material that is butt-weldable by dielectric heating in a high frequency electric field, and more particularly to a butt-weldable textile material that can be welded to provide a small, smooth welded seam. The textile material is useful for covering articles having a padded insert, particularly automobile sun visors.

BACKGROUND OF THE INVENTION

It is known to weld sheets made of non-conductive polar substances by dielectric heating in a high frequency electric field. Plastics such as polyvinyl chloride are ideal for this purpose.

Such sheets can be used as coverings for padded materials, such as for a sun visor used in automobiles. Other similar coverings in sheet form can be fabricated by this process, such as automotive vehicle ceiling liners, head rests, vehicle door paneling, arm rests, seats, etc.

The advantages of joining materials by a dielectric heating technique are the low cost and dependability provided by this method. It is a rapid and dependable process. In addition, if necessary, weld excess can be torn off directly after welding, and without use of special tools. This produces a clean and smooth weld seam which requires little, if any, working after the welding.

If it is desired to connect ordinary fiber materials such as fabrics, knitted articles, felt, or the like, by butt-joint high-frequency welding, this cannot be done because these ordinary textiles cannot be welded by this technique. They must first be coated with a polar dielectric weldable material which can be welded by high frequency. Additionally, removal of the weld excess by tearing is not possible for plastic coated materials, since the ordinary fiber material is not heated and softened by the high-frequency welding. Such coated textile materials can, therefore, only be cut around the weld seam or be freed of weld excess by stamping.

In such a case, moreover, a wide weld seam is necessary so that good adherence is achieved between the welded materials. Also, a certain minimum seam width is required where the excess is to be removed by stamping techniques. This wide seam is often unsightly and unattractive, and, if nothing more, it often requires further processing.

This invention features the butt-welding of a textile material using dielectric heating induced by a high frequency electric field. A welded textile article produced with material of this invention has a suitable weld seam that is small and smooth and that is free of protruding fiber ends.

An ordinary web of plastic fibers, even if it can be welded by high frequency and consists, for instance, of PVC fibers, still will not produce a suitable bond in the weld seam, and will produce an unsightly weld seam with protruding fiber ends that require removal by cutting or stamping.

Microscopic examination of the weld seams of previously fabricated textile articles, like woven and knitted fabrics, felts and non-wovens, have revealed that the unsightly seams were caused by insufficient weldable plastic material in the region of the welding electrode. The lack of the plastic produced a bond in which many of the threads or fibers were not welded to each other, causing a weak weld seam having protruding fibers. The weld excess or residue is manually torn off immediately following welding. But, only a fraction of the fibers present in the material are welded to each other. The greater part of the fibers are separated and have their ends free in the region of the weld seam. They, therefore, do not contribute to the strength of the weld seam. Also, the protrusion of their ends out of the weld seam produces an unattractive appearance.

SUMMARY OF THE INVENTION

One of the objects of the present invention is to create a textile material comprising a matrix of fibers that can provide a covering for a padding insert, such as in a vehicle sun visor, which textile material can be connected by butt-joint high-frequency welding to itself or to other similar materials, and further where the weld excess can be torn off directly after the welding process, as in the case of a pure sheet of polyvinyl chloride.

This invention features a textile material that is weldable by dielectric heating in a high frequency electric field. The textile material generally is in the form of a known woven or knotted fabric, felt, or the like, comprising a plastic fiber which can be welded by high frequency. The material may be covered on one surface by a backing or coating of a plastic which can be welded by high frequency. With or without a coating or backing, the textile material has an approximate weight of at least three hundred grams per square meter, and is butt-weldable with a substantially small, smooth weld seam.

The textile material can be fashioned as a covering over padding, such as in automotive sun visors.

The total weight of the plastic fiber web should not exceed approximately 1,500 grams per square meter.

The plastic-backed or coated fibers of the matrix can comprise a plastic backing or coating that weighs less than, the same as, or more than the fiber material it backs or coats. The weight ratio between the fiber and the backing or coating is in an approximate range between 1:2 and 1:3.

The weldable plastic coating or backing material on the fiber material can also comprise a polyvinyl chloride.

DETAILED DESCRIPTION OF THE INVENTION

It has been discovered that an excellent butt-joint high-frequency welded seam is obtainable if the textile material has a minimum weight of approximatly at least 300 grams per square meter. The desired weight can be obtained, for instance, by having the material in the form of a heavy felt or a thick, dense velvet fabric. Also, to obtain the desired weight, the plastic fiber material can be additionally coated with plastic on one side thereof, or the plastic may be applied in sheet form as a backing, or as a non-woven web.

If a weight per square meter of the plastic fiber material of at least 300 grams is provided, alone or together with a plastic coating, then sufficient plastic material which can be welded by high frequency is present between the weld electrodes to achieve a continuous weld seam, in which practically all the fibers of the material are welded. After the weld excess is torn off, a dependable butt weld is obtained, and, in addition, the protrusion of non-welded fiber ends is avoided.

For economic reasons, the weight per square meter of the material, by itself or together with a plastic coating, should not exceed 1,500 grams per square meter and is preferably between 435 and 575 grams per square meter. The weight per square meter of the plastic coating, if any, is selectively higher than, equal to or less than that of the fiber material. The weight per square meter of the fiber web is preferably in a ratio of 1:2 to 1:3 to that of the coating or backing on the web.

The fiber material, as already mentioned, must be capable of being welded by high frequency. It preferably consists of polyvinyl chloride both for the web of plastic fibers and for the plastic coating. Other combinations of materials are also possible, provided that the dielectric properties of the materials match each other.

The fiber material has a textile structure and consists of a woven, knitted or braided fabric. The material can also be a felt or a non-woven material. The coating may be a non-woven, or a felt, or else it may be applied in sheet form on one side of the web of plastic fiber by backing, needling or coating. A firm bond between the web of plastic fiber and the coating material is necessary.

The plastic textile material of the invention which is weldable by high frequency can be particularly used in the automobile industry for the manufacture of ceiling liners, door coverings, head rests, arm rests, seats, sun visors, etc., and can be used in other fields, such as padded clothes hangers. Possibilities of use exist wherever this material is to be connnected by butt joint in rational manner to a corresponding web and where subsequent work, such as stamping or cutting of the weld seam, is to be avoided.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A textile material comprising a web of plastic fibers that is weldable by dielectric heating in a high frequency field, the textile material having a weight of at least approximately 300 grams per square meter, and the textile material including a butt weld at a weld seam in which substantially all of the plastic fibers are integrally welded together.

2. The textile material of claim 1, wherein the material is fashioned as a covering over padding.

3. The textile material of claim 1, wherein the material is a covering for a sun visor.

4. The textile material of claim 1 further comprising a plastic coating on the fibers which can be welded by dielectric heating in a high frequency field.

5. The textile material of claim 4, wherein the plastic fiber web with the plastic coating has a maximum weight of approximately 1,500 grams per square meter.

6. The textile material of claim 4, wherein the web with the plastic coating has an approximate weight in the range between 435 and 575 grams per square meter.

7. The textile material of claim 4, wherein the plastic coating on the fibers weighs more than the fibers of the web.

8. The textile material of claim 7, wherein the fiber web has a weight ratio range to the coating thereover of approximately between 1:2 and 1:3.

9. The textile material of claim 4, wherein the plastic coating on the fibers weighs less than the fibers of the web.

10. The textile material of claim 4, wherein the coating comprises polyvinyl chloride.

11. The textile material of claim 1, further comprising a plastic coating formed as a backing on the web, the plastic coating being weldable by dielectric heating in a high frequency field.

12. The textile material of claim 11, wherein the plastic fiber web with the plastic coating has a maximum weight of approximately 1,500 grams per square meter.

13. The textile material of claim 11, wherein the web with the plastic coating has an approximate weight in the range between 435 and 575 grams per square meter.

14. The textile material of claim 11, wherein the plastic backing on the fiber web weighs more than the fibers of the web.

15. The textile material of claim 14, wherein the fiber web has a weight ratio range to the backing thereon of approximately between 1:2 and 1:3.

16. The textile material of claim 11, wherein the plastic backing on the fiber web weighs less than the fibers of the web.

17. The textile material of claim 11, wherein the backing comnprises polyvinyl chloride.

18. The textile material of claim 1, wherein the plastic fiber web has a maximum weight of approximately 1,500 grams per square meter.

19. The textile material of claim 1, wherein the web has approximate weight in the range between 435 and 575 grams per square meter.

20. The textile material of claim 1, wherein the weldable web comprises polyvinyl chloride.

21. A solid-plastic backed textile material comprising a web of plastic fibers that is weldable by dielectric heating in a high frequency field, the solid-plastic backed textile material having a composite weight of at least approximately 300 grams per square meter and including a butt weld at a weld seam in which substantially all of the plastic fibers are integrally welded together.

22. The solid-plastic backed textile material of claim 21, wherein the material is fashioned as a covering over padding.

23. The solid-plastic backed textile material of claim 21, wherein the material is a covering for a sun visor.

24. The solid-plastic backed textile material of claim 21, wherein the material has a maximum weight of approximately 1,500 grams per square meter.

25. The solid-plastic backed textile material of claim 21, wherein the material has an approximate weight in the range between 435 and 575 grams per square meter.

26. The solid-plastic backing on the textile material claim 21, wherein the plastic backing on the textile material weighs more than the fibers of the textile material.

27. The solid-plastic backed textile material of claim 21, wherein the plastic backing on the textile material weighs less than the fibers of the textile material.

28. The solid-plastic backed textile material of claim 21, wherein the fiber web has a weight ratio range to the plastic backing thereon of approximately between 1:2 and 1:3.

29. The solid-plastic backed textile material of claim 21, wherein the weldable web comprises polyvinyl chloride.

30. The solid-plastic backed textile material of claim 21, wherein the plastic backing comprises polyvinyl chloride.

31. A textile material comprising plastic fiber material formed as heavy felt and weldable by dielectric heating in a high frequency field, the textile material having a composite weight of at least approximately 300 grams per square meter and including a butt weld at a weld seam in which substantially all of the plastic fibers are integrally bonded together.

32. The textile material of claim 31, wherein the material is fashioned as a covering over padding.

33. The textile material of claim 31, wherein the material is a covering for a sun visor.

34. The textile material of claim 31, further comprising a plastic coating on the fibers which can be welded by dielectric heating in a high frequency field.

35. The textile material of claim 34, wherein the coating comprises polyvinyl chloride.

36. The textile material of claim 31, further comprising a plastic coating formed as a backing on the felt, the plastic coating being weldable by dielectric heating in a high frequency field.

37. The textile material of claim 36, wherein the backing comprising polyvinyl chloride.

38. The textile material of claim 31, wherein the weldable felt comprises polyvinyl chloride.

39. A textile material comprising plastic fiber material formed as thick, dense velvet fabric and weldable by dielectric heating in a high frequency field, the textile material having a composite weight of at least approximately 300 grams per square meter and including a butt weld at a weld seam in which substantially all of the plastic fibers are integrally bonded together.

40. The textile material of claim 39, wherein the material is fashioned as a covering over padding.

41. The textile material of claim 39, lwherein the material is a covering for a sun visor.

42. The textile material of claim 39, further comprising a plastic coating on the fibers which can be welded by dielectric heating in a high frequency field.

43. The textile material of claim 42, wherein the coating comprises polyvinyl chloride.

44. The textile material of claim 39, further comprising a plastic coating formed as a backing on the fabric the plastic coating being weldable by dielectric heating in a high frequency field.

45. The textile material of claim 44, wherein the backing comprises polyvinyl chloride.

46. The textile material of claim 39, wherein the weldable fabric comprises polyvinyl chloride.

47. A plastic backed textile material comprising plastic fiber material backed by a non-woven web and being weldable by dielectric heating in a high frequency field, the plastic backed textile material having a composite weight of at least approximately 300 grams per square meter and including a butt weld at a weld seam in which substantially all of the plastic fibers are integrally bonded together.

48. The textile material of claim 47, wherein the plastic fiber material is fashioned as a covering over padding.

49. The textile material of claim 47, wherein the plastic fiber material is a covering for a sun visor.

50. The textile material of claim 47, wherein the weldable plastic fiber material backed by a non-woven web comprises polyvinyl chloride.

* * * * *